UNITED STATES PATENT OFFICE.

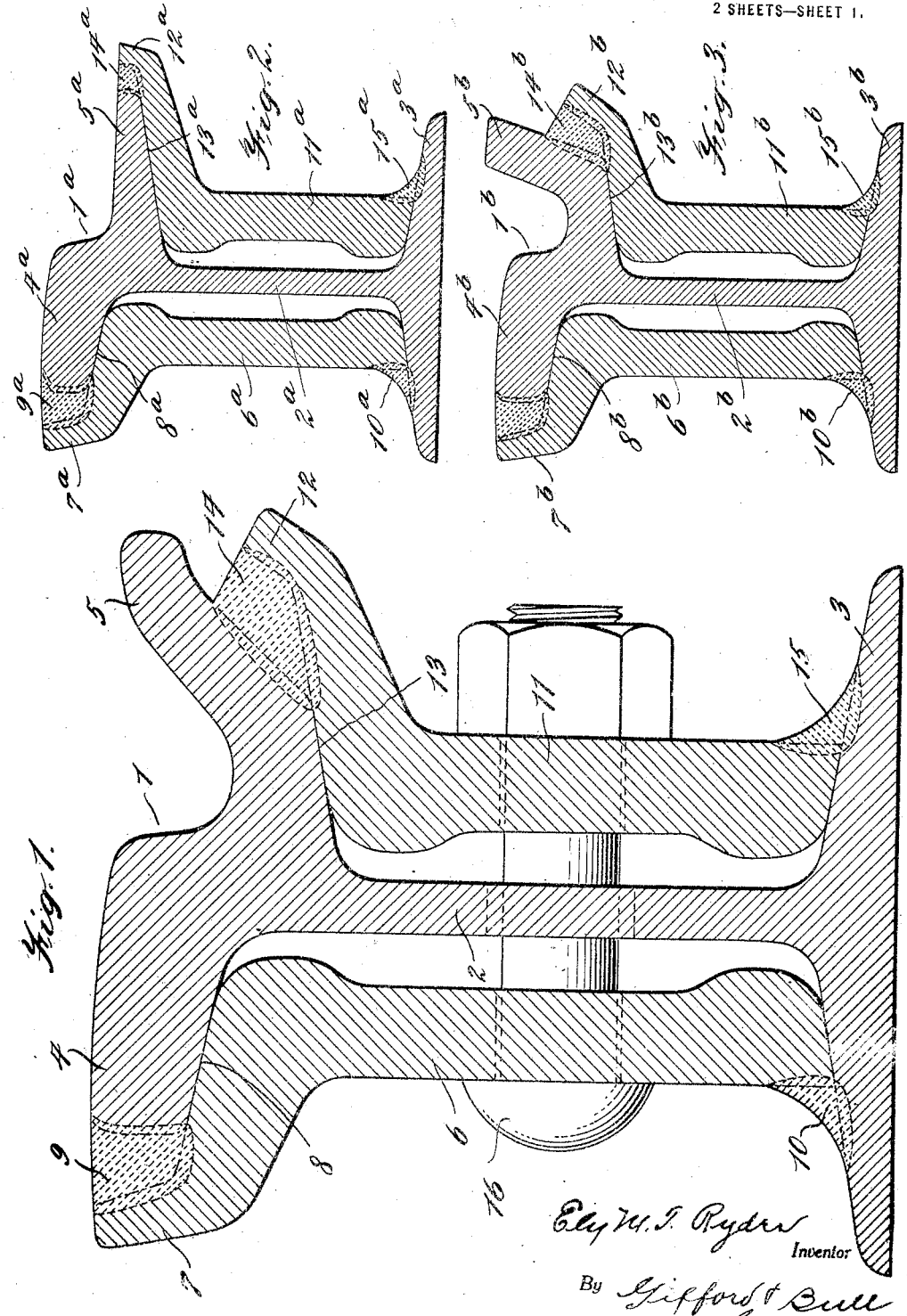

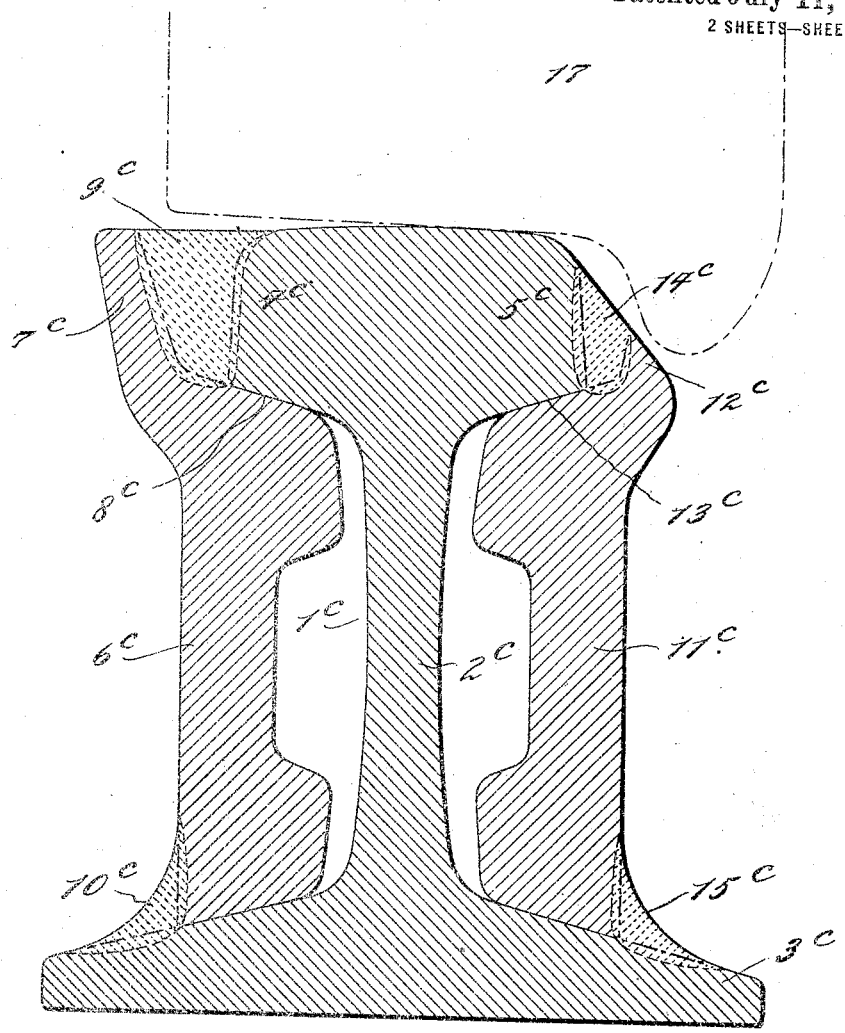

ELY M. T. RYDER, OF YONKERS, NEW YORK.

WELDED RAIL JOINT.

1,422,623.

Specification of Letters Patent. Patented July 11, 1922.

Application filed January 27, 1922. Serial No. 532,180.

*To all whom it may concern:*

Be it known that I, ELY M. T. RYDER, a citizen of the United States, residing at Yonkers, in the county of Westchester and State of New York, have invented certain new and useful Improvements in Welded Rail Joints, of which the following is a specification.

Hitherto welded rail-joints employing joint plates have commonly been prepared either by welding the plates to or against the web of the rail, or by welding the top and bottom surfaces of the plates to or against the bottom and top surfaces of the head and base flanges of the rails, respectively. With plates welded against the web of the rail, the head of the rail is not rigidly held or supported, and with plates welded to or against the under side of the rail head, the welded areas are relatively small and are obtained at the expense of diminishing the mechanical contact between the fish plate and the under side of the rail head, commonly known as the fishing-surface. Furthermore, a weld of this character is located directly underneath the rail head or flange and is subjected to the directly transmitted, vertical blow from the rolling-wheel load. Such welds are ordinarily difficult to make, as welding operations of this character are commonly carried out on urban railways where the rails are embedded in the pavement, the top of the rails being located substantially at the level of the pavement. Furthermore, in cases where the pavement has to be removed to enable the welding work to be done, the expense of removing and replacing sufficient of the pavement to permit the operation to be done to the best advantage, is very considerable.

In accordance with my invention, the top of the joint or fish-plate, which is less in length than either of the adjacent rails, is extended outwardly and upwardly past the plane of the fishing-surface, and the weld is preferably made between the inside of the joint or fish-plate as extended and the outside of the head or lip of the rail, the top of the plate being sufficiently spaced from the rail flange to permit a welding operation to be carried on therein. In accordance with my invention, the welded areas are relatively large and the entire mechanical contact of the fishing-surface is preserved. Furthermore, the weld is in a position to transfer the load in shear from the side of the rail head to the side of the joint plates, and the weld being located at the side of the rail head or flange is directly visible to the operator at all times and is in the most favorable position for carrying out the welding operation.

My invention will best be understood by reference to the accompanying drawings, in which I have illustrated the preferred form of my invention applied to various types of rails, and in which Figure 1 is a sectional view through a rail of what is commonly called the Trilby type, with the fish-plates welded thereto in accordance with my invention; Figs. 2, 3 and 4 are views similar to Fig. 1, illustrating my invention applied to flange, guard and T-rails, respectively. In Figs. 2, 3 and 4 parts similar to those in Fig. 1 are indicated by corresponding numerals with the letter $a$, $b$ and $c$, respectively, appended.

Referring, now, to the drawings, and first to Fig. 1, 1 indicates generally a rail of what is known as the Trilby type, provided with a web 2, a base or lower flange 3, a head or upper flange 4, and a lip or upper flange 5, between which and the head is located the groove usual in this type of rail for receiving the flange of the wheel. The fish-plates 6 and 11, in accordance with my invention, are extended outwardly, and are also extended upwardly past the plane of the normal fishing-surface 8; that is to say, the surface underneath the head or flange 4 which is engaged by the fish-plate, as indicated, the plate overlapping the adjacent alined ends of two rails. Preferably, a groove or recess is formed between the upper portion 7 of the fish-plate and the edge of the head or flange 4 of the rail, and provides a space through which the inner side of the fish-plate is welded to the outside of the head or flange of the rail. The welding operation may be carried out electrically, either by placing welding material in the recess or groove and using a carbon arc, in a well known manner, or the welding metal may be derived from a metallic welding electrode, or the work may be done by gas or thermit welding methods. It will be apparent that the normal fishing-surface between the fish-plate and the head or flange of the rail is preserved, the weld 9 being formed beyond the normal fishing-surface and in a position where the welding operation may readily and expeditiously be carried out. The lower portion of the fish-plate is preferably welded to the flange 3 of the rail, as at 10.

The fish-plate 11, on the opposite side of the rail, is also preferably welded to the rail in accordance with my invention, the fish-plate being provided at its top with a portion 12 extending outwardly and which is also extended upwardly past the plane of the fishing-surface 13. The inner side of the fish-plate so extended is, in this case, welded to the guard or flange 5 of the rail, as at 14, and the lower portion of the fish-plate is welded to the flange of the rail, as at 15.

The fish-plates 6 and 11 are preferably clamped against the rail by bolts passing through the plates and the web of the rail, one such bolt being indicated at 16.

The fish-plates may be made of any desired material, and in any desired manner. In the drawings rolled plates are illustrated. It will be understood, however, that they may be otherwise formed, as by casting or forging, and that they may be formed as a single piece, or of a plurality of pieces suitably secured together, as by welding.

I have illustrated my invention in Figs. 2 and 3 in connection with rails of the flange and guard type, respectively, and as the parts are similar to those illustrated in Fig. 1, no further description is necessary.

In Fig. 4 I have illustrated my invention in connection with a T-rail, in which the parts, including the welds, are arranged to cooperate with the flanged car wheel of the ordinary type, illustrated in dotted lines at 17. It will, of course, be understood that clamping bolts may be used in the arrangements illustrated in Figs. 2, 3 and 4.

What I claim and desire to secure by Letters Patent of the United States is:

1. In combination, alined rails having at their tops laterally-extending flanges, a fish-plate less in length than either adjacent rail having a surface engaging the under sides of said flanges and extending outwardly and upwardly adjacent thereto past the plane of such surfaces and forming with said flanges upwardly-facing grooves, and welding material within the grooves welding the side of said plate to the sides of said flanges.

2. A rail-joint comprising alined rails provided at their tops with laterally-extending flanges and a joint plate less in length than either adjacent rail extending upwardly by the side of said flanges and spaced therefrom sufficiently to permit a welding operation to be carried on therein, and welding material within the space between said plate and said flanges and welding the side of said plate directly to the sides of said flanges.

3. A rail-joint comprising alined rails provided at their tops with laterally-extending flanges, and a fish-plate less in length than either adjacent rail having a fishing-surface engaging the under sides of the flanges of said rails and extending outwardly and upwardly adjacent to said flanges past the plane of such fishing-surfaces and spaced from said flanges sufficiently to permit a welding operation to be carried on therein, and having its side welded directly to the side of said flanges.

4. A rail-joint comprising alined rails provided at their tops with laterally-extending flanges, and a fish-plate less in length than either adjacent rail having a fishing-surface engaging the under sides of the flanges of said rails and extending outwardly and upwardly adjacent but spaced therefrom to said flanges and substantially to the top thereof and having its side welded directly to the side of said flanges.

5. A rail-joint comprising alined rails provided at their tops and bottoms with laterally-extending flanges, and a fish-plate less in length than either adjacent rail welded to the top and bottom flanges of said rails, the upper portion of said fish-plate extending outwardly and upwardly past the plane of the fishing-surface of said rails and spaced therefrom sufficiently to permit a welding operation to be carried on therein, the upper portion of the fish-plate being welded at its side to the side of the top flanges of said rails.

6. A rail-joint comprising alined rails provided at their tops with flanges extending laterally therefrom on both sides, and fish-plates of less length than either adjacent rail on both sides of the rails extending outwardly and upwardly past the planes of the fishing-surfaces and spaced therefrom sufficiently to permit a welding operation to be carried on therein, and welded on their sides to the side of the flanges on the respective sides of the rails above the fishing-surfaces.

7. In combination, alined rails having at their tops laterally-extending flanges, a fish-plate less in length than either adjacent rail having a surface engaging the undersides of said flanges and extending outwardly and upwardly adjacent thereto past the plane of such surfaces and forming with said flanges upwardly-facing grooves, and welding material substantially filling said grooves and welding the plate to the flanges of said rails.

8. A rail-joint comprising alined rails provided at their tops with laterally-extending flanges, a fish-plate less in length than either adjacent rail having a fishing-surface engaging the under sides of the flanges of said rails and extending outwardly and upwardly adjacent to said flanges and substantially to the top thereof, and welding material substantially filling the space between said plate and said flanges and welding said plate directly to said flanges.

9. A rail-joint comprising alined rails provided with flanges, and with a wheel-flange-receiving groove, a joint plate less in length than either adjacent rail extending outwardly and upwardly adjacent to the rail flanges and forming with said rail flanges an upwardly-facing groove, and welding material within the groove for welding said plate to said rail flanges.

ELY M. T. RYDER.